United States Patent
Jaksons et al.

(10) Patent No.: US 11,073,673 B2
(45) Date of Patent: Jul. 27, 2021

(54) CABLE FIXATION DEVICES AND METHODS

(71) Applicants: COMMSCOPE CONNECTIVITY BELGIUM BVBA, Kessel-Lo (BE); ADC CZECH REPUBLIC, S.R.O., Brno (CZ)

(72) Inventors: Karel An Johan Jaksons, Kessel-Lo (BE); Eric Schurmans, Geetbets (BE); Peter Jerome Istas, Sint-Truiden (BE); Jiri Zavrel, Leuven (BE); Denys Mizin, Brno (CZ); Jiri Pasek, Brno (CZ); Jiri Ambroz, Brno (CZ); Ales Smisek, Policka (CZ)

(73) Assignees: CommScope Connectivity Belgium BVBA, Kessel-Lo (BE); ADC Czech Republic, S.R.O., Brno (CZ)

( * ) Notice: Subject to any disclaimer, the term of this patent is extended or adjusted under 35 U.S.C. 154(b) by 0 days.

(21) Appl. No.: 16/725,820

(22) Filed: Dec. 23, 2019

(65) Prior Publication Data

US 2020/0241229 A1    Jul. 30, 2020

Related U.S. Application Data

(63) Continuation of application No. 15/106,324, filed as application No. PCT/EP2014/078571 on Dec. 18, 2014, now Pat. No. 10,520,695.
(Continued)

(51) Int. Cl.
    *G02B 6/44* (2006.01)
(52) U.S. Cl.
    CPC ......... *G02B 6/4471* (2013.01); *G02B 6/4452* (2013.01); *G02B 6/4444* (2013.01)

(58) Field of Classification Search
    CPC ... G02B 6/4444; G02B 6/4452; G02B 6/4471
    See application file for complete search history.

(56) References Cited

U.S. PATENT DOCUMENTS

| 4,679,896 A | * | 7/1987 | Krafcik | G02B 6/444 385/135 |
| 5,280,556 A | * | 1/1994 | Jones | G02B 6/4444 385/139 |

(Continued)

FOREIGN PATENT DOCUMENTS

| DE | 37 24 977 A1 | 2/1989 |
| EP | 1 168 018 A2 | 1/2002 |

(Continued)

OTHER PUBLICATIONS

International Search Report for PCT Patent Application No. PCT/EP2014/078571 dated Oct. 14, 2015, 6 pages.

*Primary Examiner* — Chris H Chu
(74) *Attorney, Agent, or Firm* — Merchant & Gould P.C.

(57) ABSTRACT

A cable fixation device (100, 200, 300, 400) includes a base (102, 202) with fastener holes (104), an upright (110, 208) projecting from the base and including a fixation projection (126, 212, 316, 318) having a reduced dimensional portion (128, 214, 324) for receiving a cable tie (152, 222, 326). Protrusions (130, 218, 320) are provided for engaging the cable jacket. Variations on the cable fixation device include a fixation element (130, 218, 320) which can slide and/or rotate about a vertical rod; a plate element (304) which includes a plurality of fixation projections extending between two rods; and a plurality of uprights (208) integrally formed with the base and including forwardly and rearwardly projecting projections. The base (102, 202) and the fixation projections (126, 212, 316, 318) can be made from molded plastic.

6 Claims, 14 Drawing Sheets

Related U.S. Application Data

(60) Provisional application No. 61/917,754, filed on Dec. 18, 2013.

(56) References Cited

U.S. PATENT DOCUMENTS

| | | | | |
|---|---|---|---|---|
| 5,655,044 | A * | 8/1997 | Finzel | G02B 6/4442 385/135 |
| 6,591,054 | B2 * | 7/2003 | Afflerbaugh | G02B 6/0218 385/134 |
| 7,460,757 | B2 * | 12/2008 | Hoehne | G02B 6/4455 385/134 |
| 2010/0054688 | A1 | 3/2010 | Mullaney et al. | |
| 2010/0054689 | A1 | 3/2010 | Mullaney et al. | |
| 2012/0318933 | A1 * | 12/2012 | Kimbrell | G02B 6/4471 248/56 |

FOREIGN PATENT DOCUMENTS

| | | |
|---|---|---|
| EP | 2 148 231 A1 | 1/2010 |
| EP | 2 482 108 A1 | 8/2012 |
| JP | 3-034788 B2 | 4/2000 |
| WO | 2013/117484 A1 | 8/2013 |

* cited by examiner

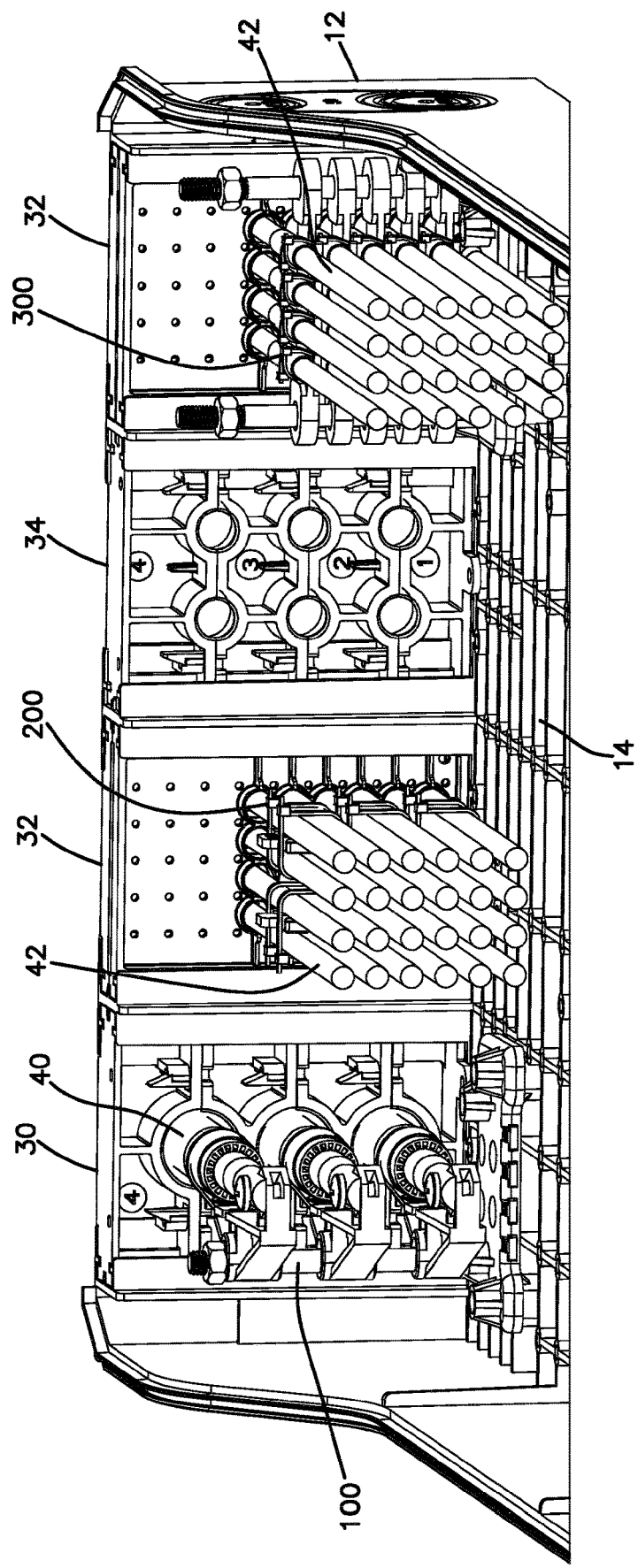

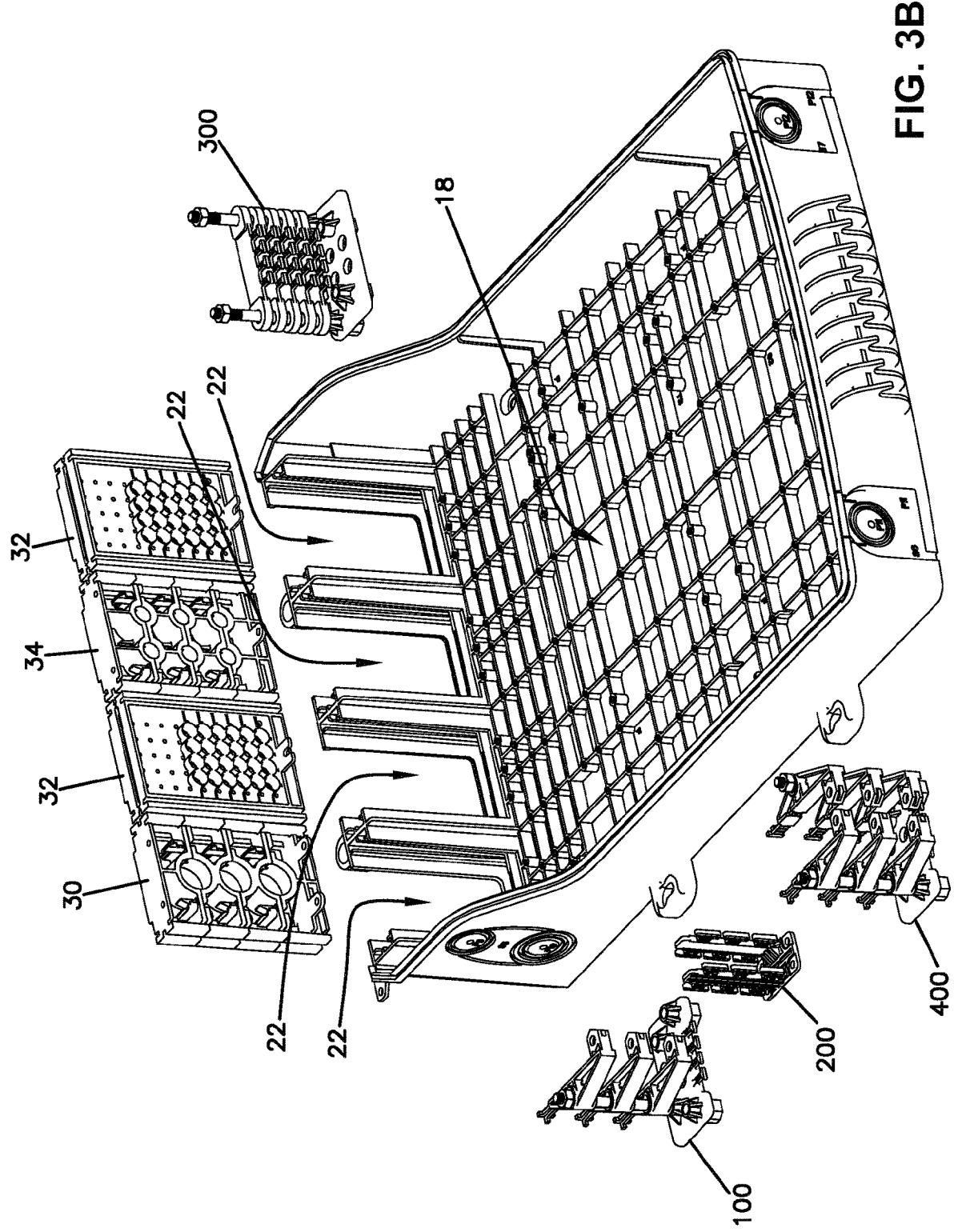

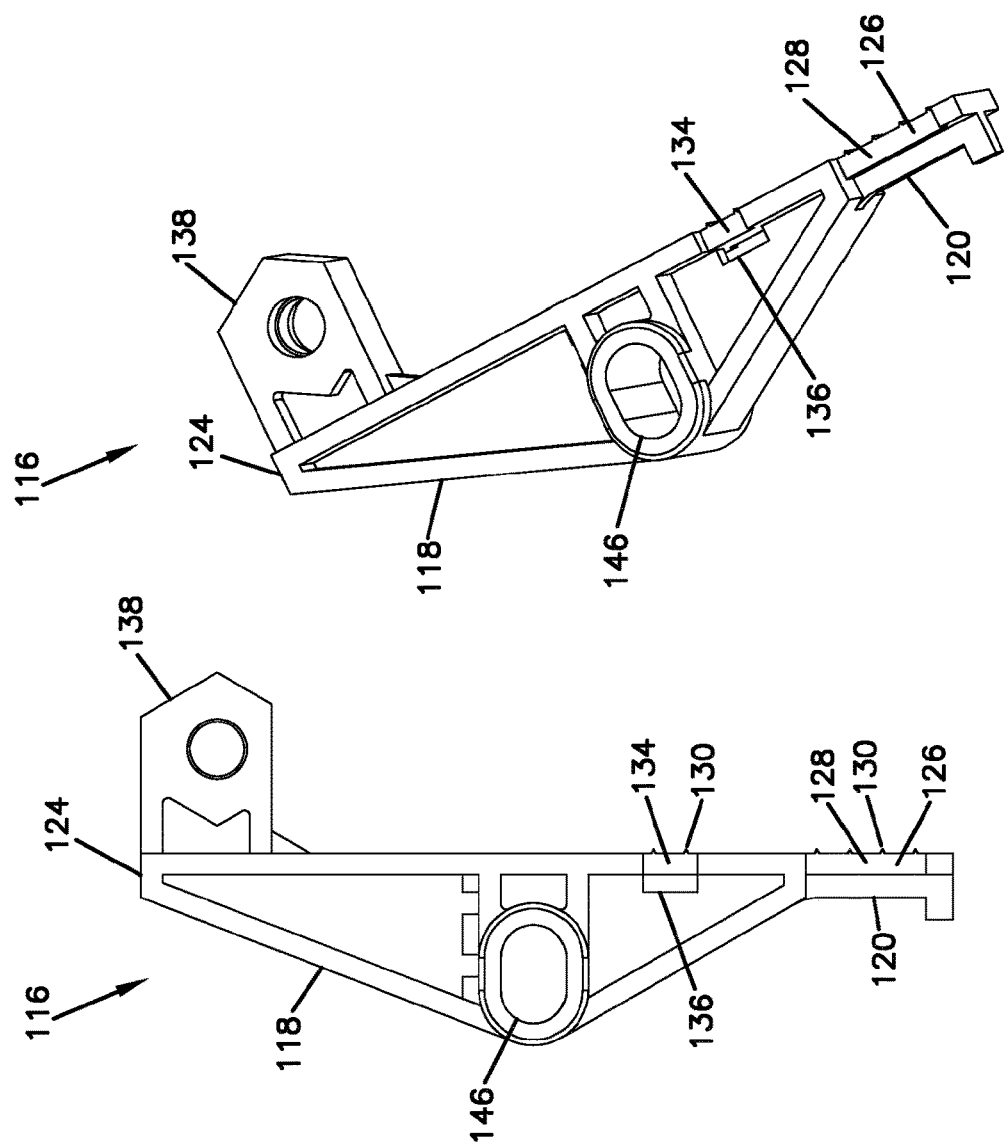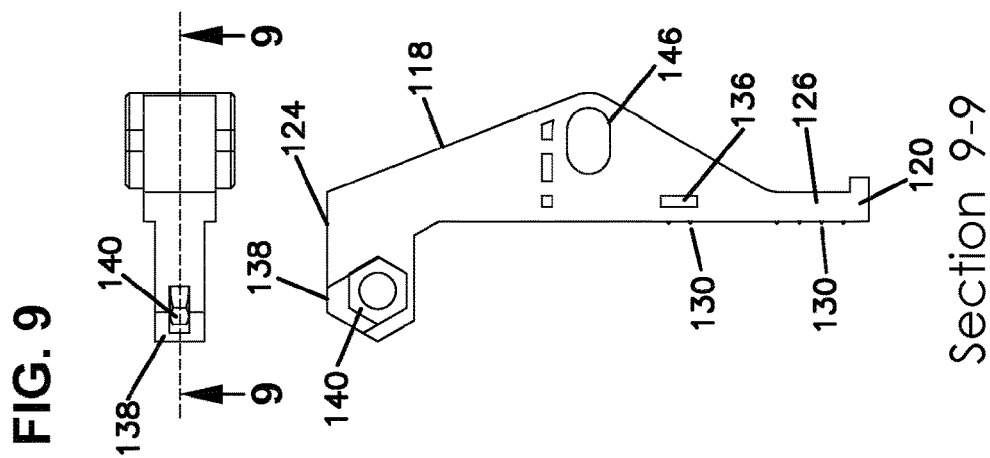

CABLE FIXATION DEVICES AND METHODS

CROSS-REFERENCE TO RELATED APPLICATION(S)

This application is a Continuation of U.S. patent application Ser. No. 15/106,324 filed on Jun. 20, 2016, now U.S. Pat. No. 10,520,695, which is a National Stage of PCT/EP2014/078571, filed on Dec. 18, 2014, which claims benefit of U.S. patent application Ser. No. 61/917,754 filed on Dec. 18, 2013, and which applications are incorporated herein by reference. To the extent appropriate, a claim of priority is made to each of the above disclosed applications.

BACKGROUND

Telecommunications systems such as fiber optic communications systems are becoming prevalent in part because service providers want to delivery high band width communication capabilities to customers. Fiber optic communications systems employ a network of fiber optic cables to transmit large volumes of data and voice signals over relatively long distances. Being part of a large fiber optic network, cables routed to and from telecommunications equipment may be exposed to pulling, pushing or rotational forces. It is desirable to provide effective cable fixation or termination for fiber optic cables that are secured or anchored to telecommunications equipment or fixtures to limit damage to optical fibers within the cables and/or connections within the telecommunications equipment.

SUMMARY

One aspect of the present invention relates to a cable fixation device including a base mountable to telecommunications equipment and including at least one upright projecting from the base. The upright includes a fixation projection having a reduced dimensional portion for receiving a cable tie.

In one implementation, the reduced dimensional portion includes protrusions for engaging a cable jacket.

In one implementation, the base and the fixation projection are made from plastic.

In a further implementation, the upright along with the base and the fixation projection are made from plastic.

In one implementation, the base includes at least one hole for receiving a rod. The rod forms an upright, and the fixation projection is positioned on the rod.

In one implementation, the rod receives a plurality of separate fixation projections.

In one implementation the base includes at least two holes, each hole receiving a rod, and each rod forming an upright. Each rod receives a plurality of separate fixation projections. In some implementations, the fixation projections can pivot on the rod or rods. In some implementations, the fixation projections are positioned on plates which connect to two rods.

One implementation of the cable fixation device includes a base with at least one hole for a projecting rod wherein the rod receives one or more fixation elements for each connecting to a cable. The fixation elements can move in one or more of the following manners: axially along the rod, transversely relative to the rod, and rotationally relative to the rod.

In one implementation, the fixation element can include a strength member clamp.

In another implementation, the fixation element can include two reduced dimensional portions, each portion sized for receiving a cable tie.

In one implementation, the cable fixation device includes a base with two upright rods and a plurality of plates which span between the two rods to hold a plurality of fixation projections on each plate. The plate includes two holes, one for receiving each rod, wherein one of the holes includes an oval shape. The plates are moveable axially along the rods.

The plurality of different holes on the base can be provided so that the rods can be selectively placed in a desired hole or holes.

Another implementation of the cable fixation device includes a base integrally formed with one or more uprights. Each upright includes a plurality of fixation projections projecting outwardly from the upright. In one implementation, each upright includes a forwardly projecting fixation projection and a rearwardly projecting fixation projection. The forwardly and rearwardly projecting fixation projections are axially aligned. Each fixation projection can receive a cable tie. In one implementation, the pairs of fixation projections can receive one, two, three or four cables.

BRIEF DESCRIPTION OF THE DRAWINGS

FIG. 2 is the perspective view of claim 1, with some example cables shown fixed to the enclosure;

FIGS. 3A-3C are perspective views showing the cable entry locations, and the cable fixation devices positioned in and exploded from the rest of the enclosure;

FIG. 7 is a further perspective view of the fixation element of FIG. 6;

FIG. 8 is a top view of the fixation element of FIG. 7;

FIG. 9 is an end view of the fixation element of FIG. 8;

FIG. 10 is a cross-sectional view of the fixation element of FIG. 9, taken along lines 9-9;

DETAILED DESCRIPTION

The present disclosure relates to arrangements and methods for providing effective fixation of telecommunications cables to telecommunications equipment.

According to one example embodiment, the telecommunications equipment discussed herein are fiber optic equipment and the telecommunications cables discussed herein are fiber optic cables that define an outer jacket and at least one optical fiber therein. In some implementations, the fiber optic cables include a strength member or members. In some implementations, the fiber optic cable may include multiple optical fibers.

It should be noted that a fiber optic cable is simply one example of a telecommunications cable that may be used to describe the inventive features of the cable fixation device of the present disclosure and other types of cables, including electrical cables and hybrid cables that may be terminated with the devices discussed herein.

According to one example embodiment, the fixation device of the present disclosure may be referred to as a cable fixation device 10. As will be described herein and shown in the accompanying drawings, several embodiments are provided for cable fixation device 10. The cable fixation device 10 of the present disclosure may be used to fix cables to a variety of different telecommunications equipment. The telecommunications equipment, including fiber optic equipment, to which telecommunications cables are fixed using device 10 of the present disclosure may also be referred to as equipment, fixture, or enclosure 12. As used herein, the examples shown are for an enclosure 12.

Figure 1:
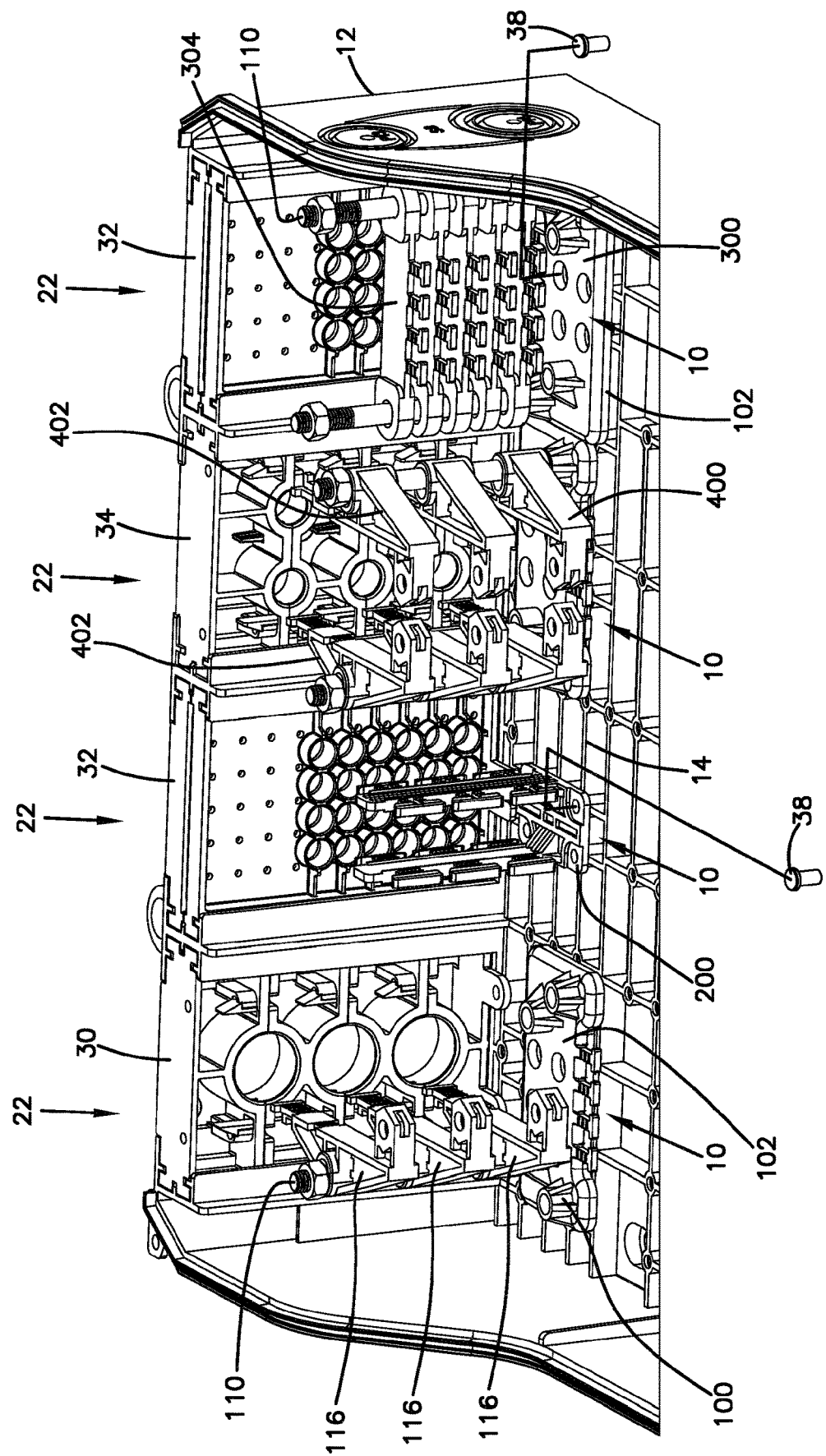
FIG. 1 is a perspective view of a telecommunications enclosure that includes several cable fixation devices, and shown without the enclosure cover, and without the cables.
Figure 3A:
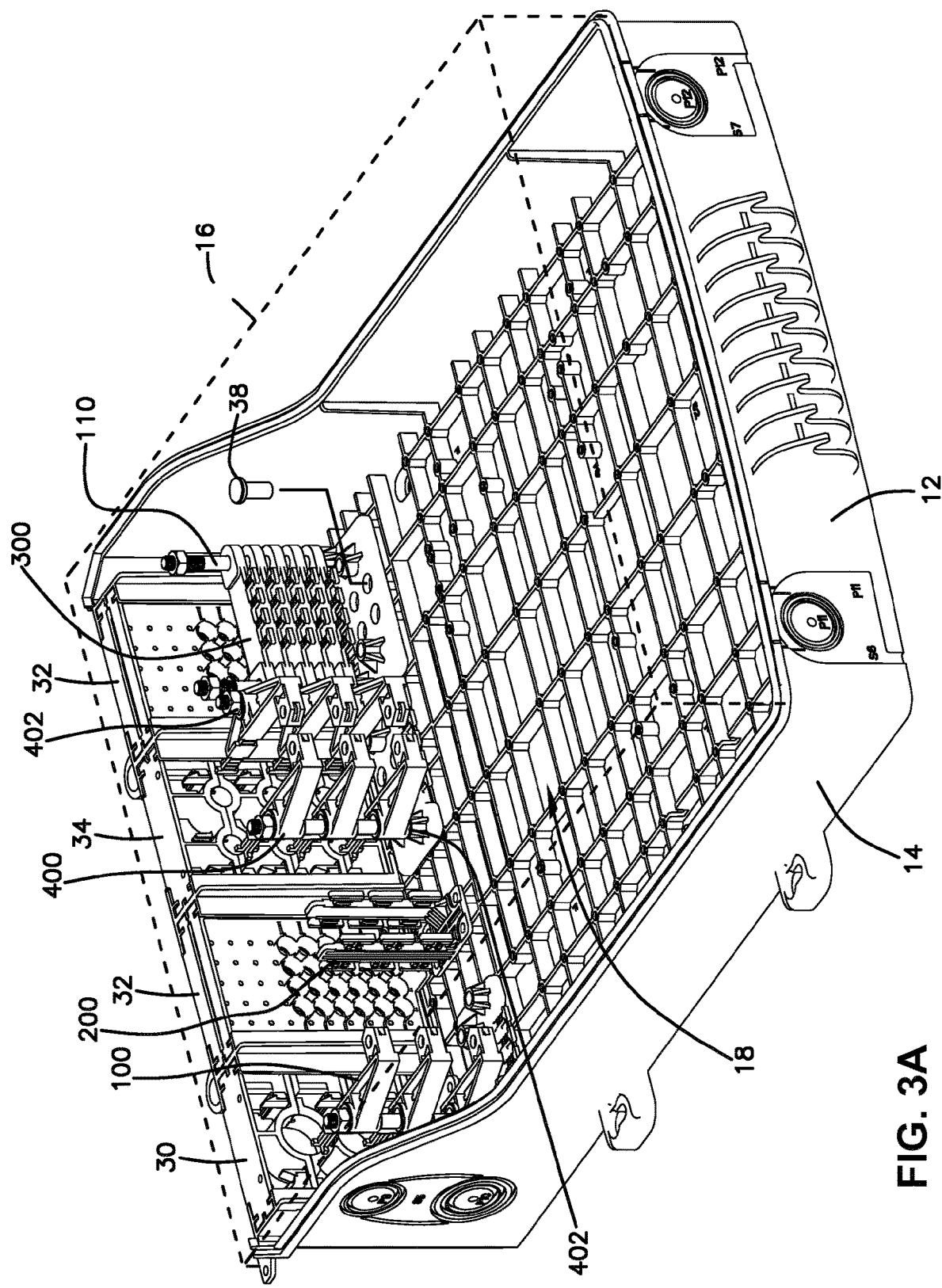
Figure 3C:
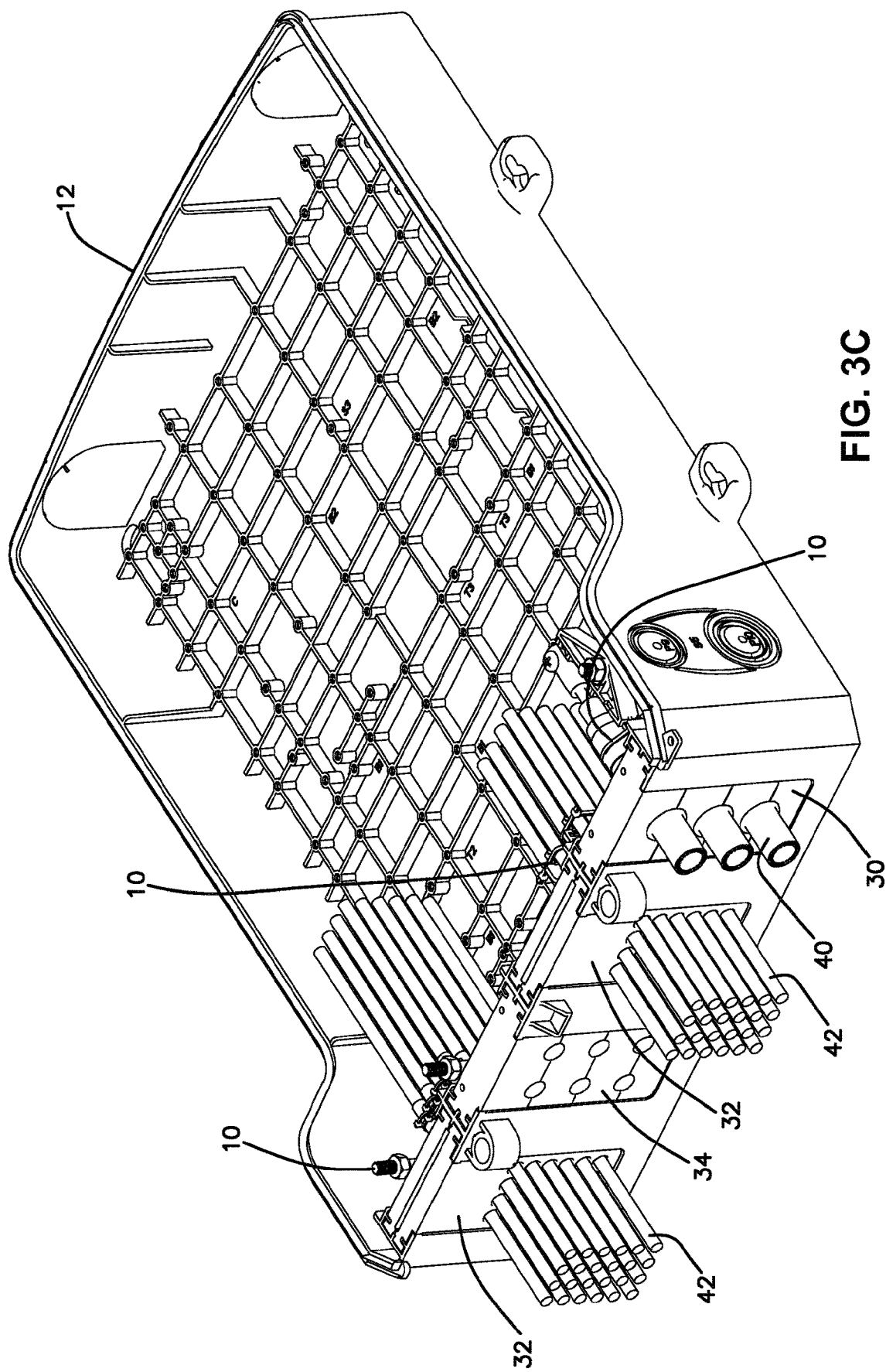
Figure 4:
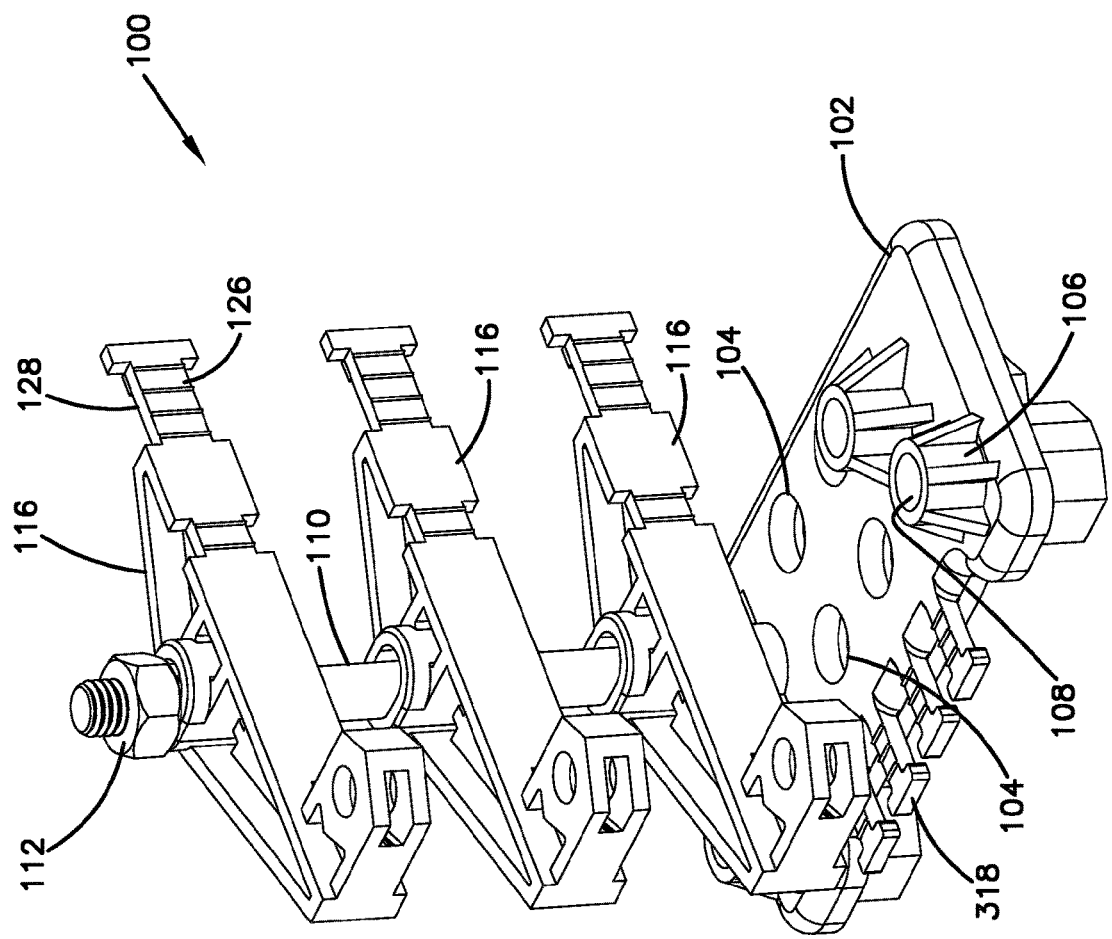
FIG. 4 is a perspective view of a first embodiment of a cable fixation device.
Figure 13:
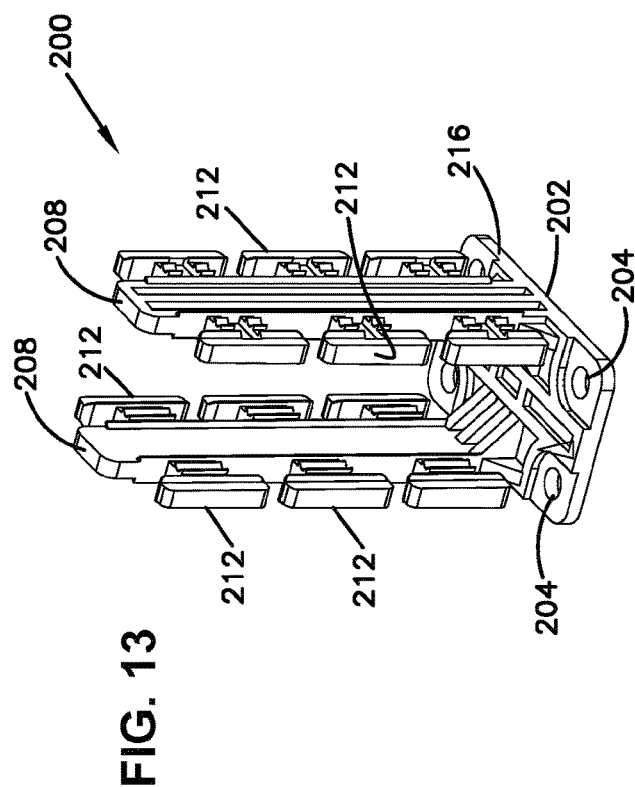
FIG. 13 is a perspective view of a second embodiment of a cable fixation device.
Figure 18:
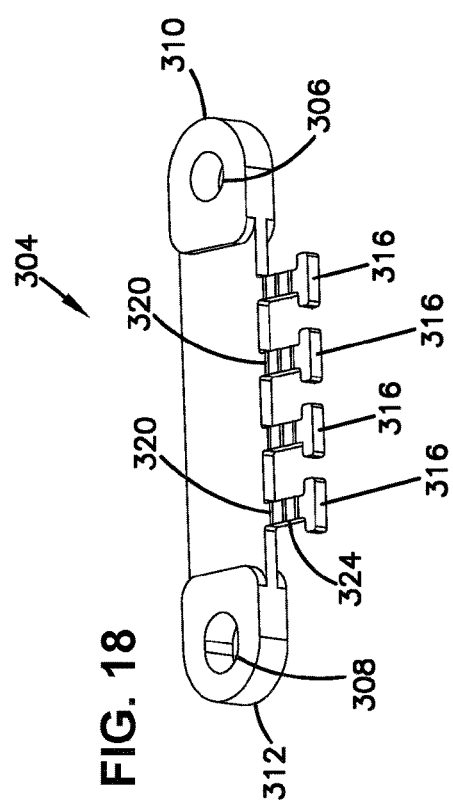
FIG. 18 is a perspective view of a cable fixation plate of the device of FIG. 17.
Figure 6:
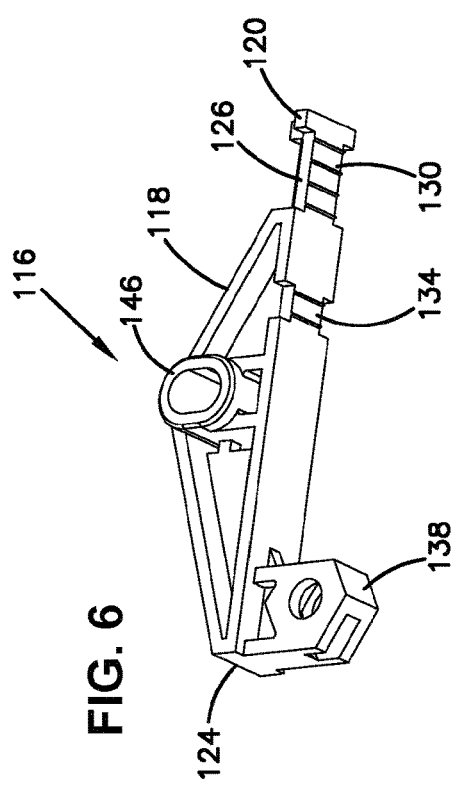
FIG. 6 is a perspective view of a fixation element of the device of FIG. 4.
Figure 5:
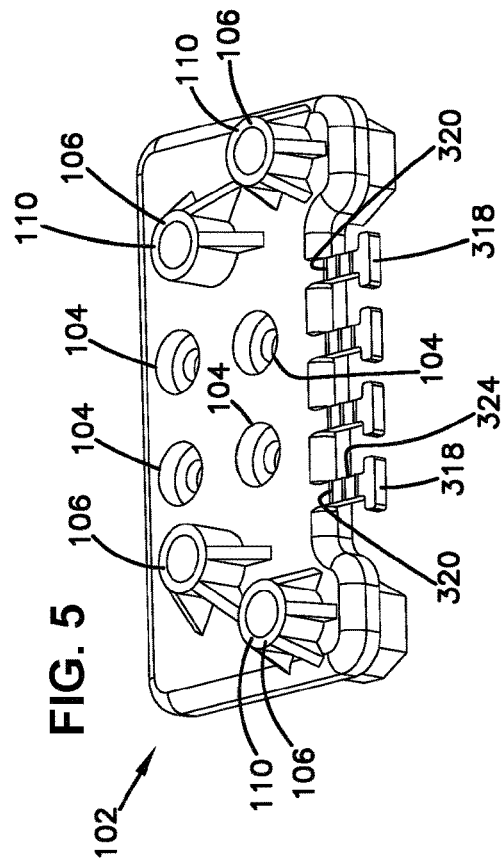
FIG. 5 is a perspective view of a base of the cable fixation device of FIG. 4.
Figure 12:
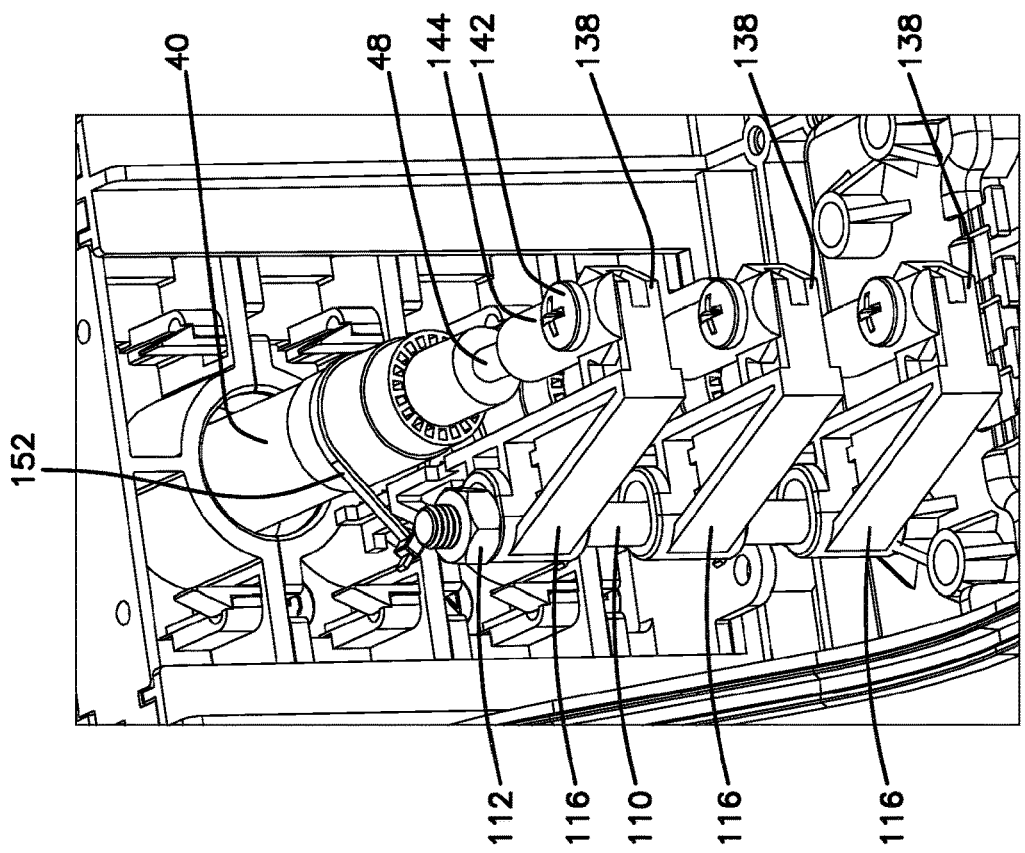
FIG. 12 is another view of the cable fixation device, cables, and enclosure of FIG. 11.
Figure 11:
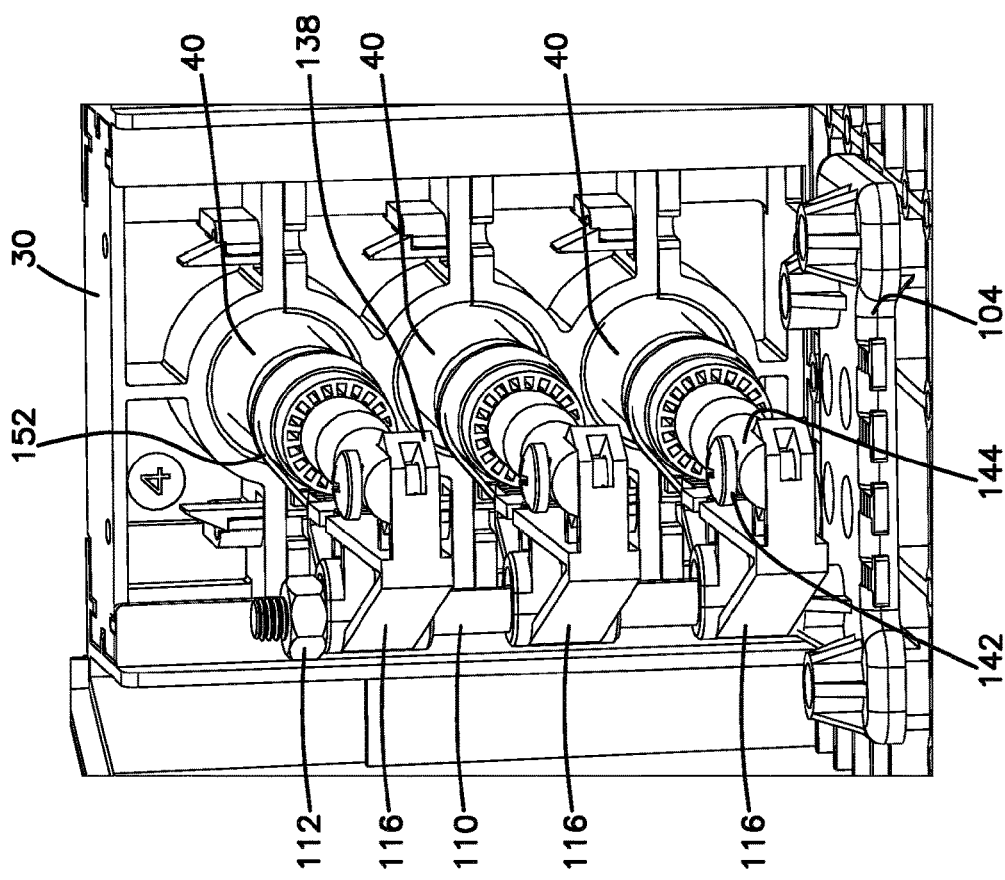
FIG. 11 shows the cable fixation device of FIG. 4 fixing three cables to the enclosure.
Figure 14:
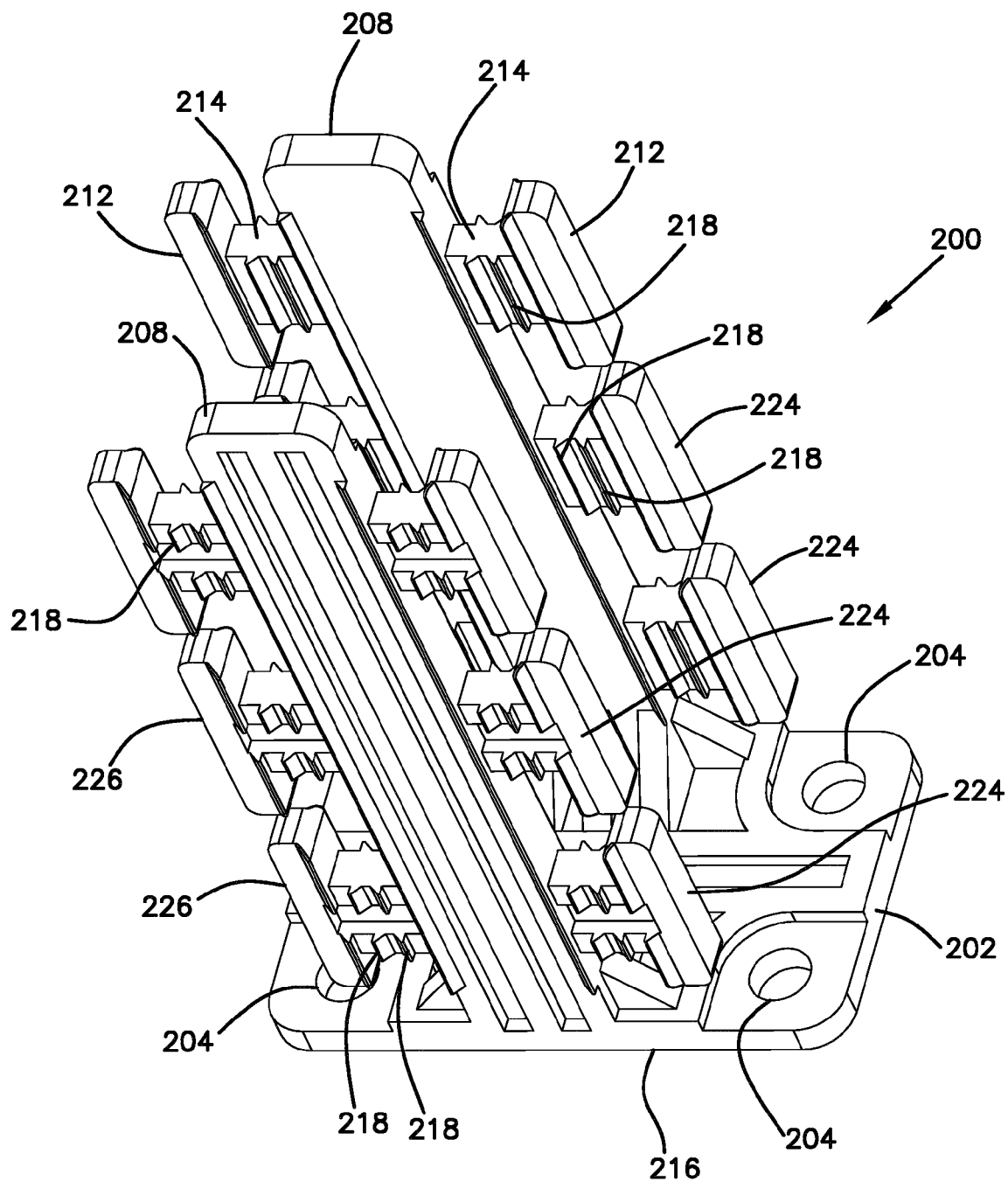
FIG. 14 is another perspective view of the cable fixation device of FIG. 13.
Figure 15:
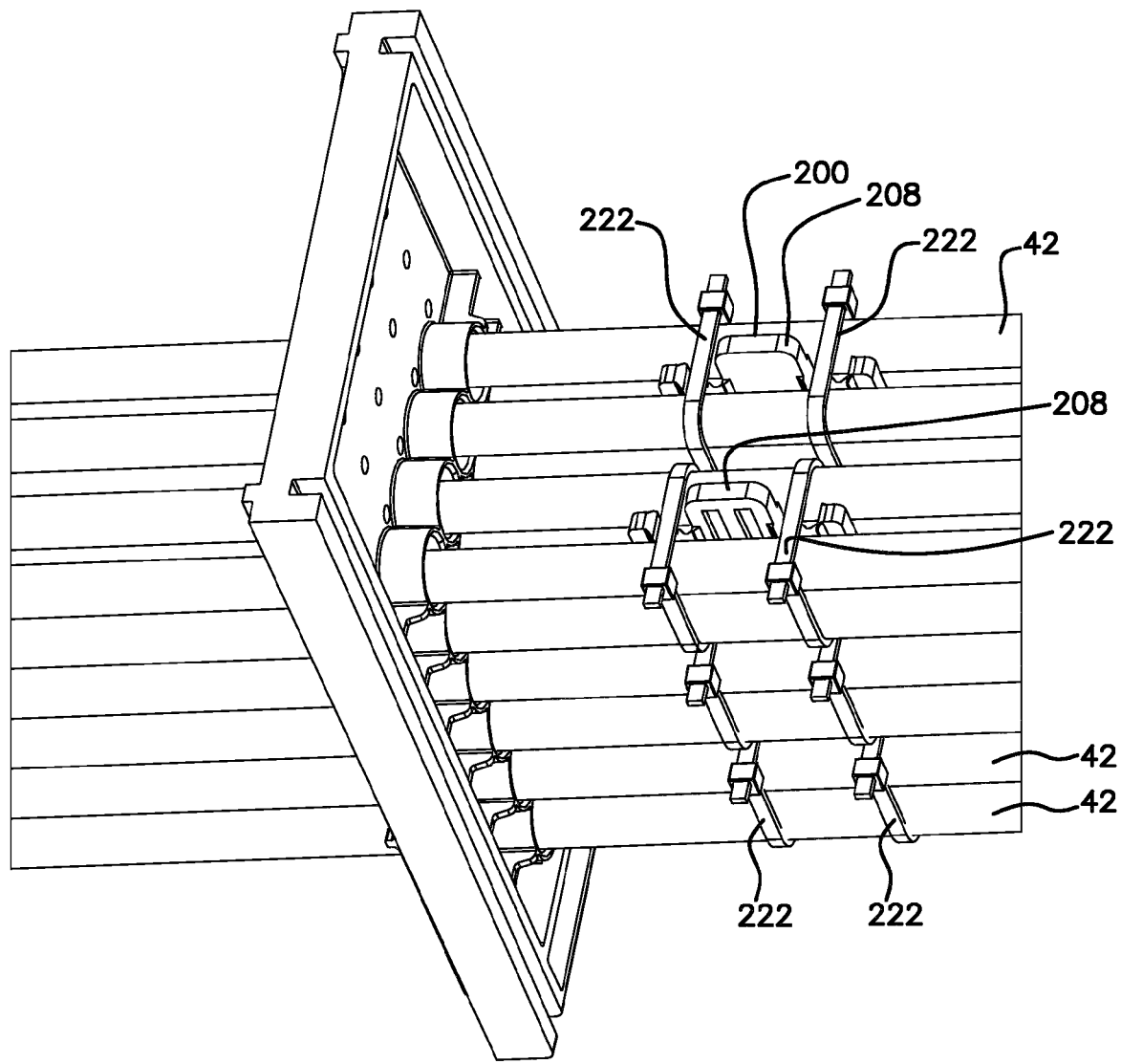
FIGS. 15 and 16 show the cable fixation device of FIGS. 13 and 14 fixing cables to the enclosure.
Figure 16:
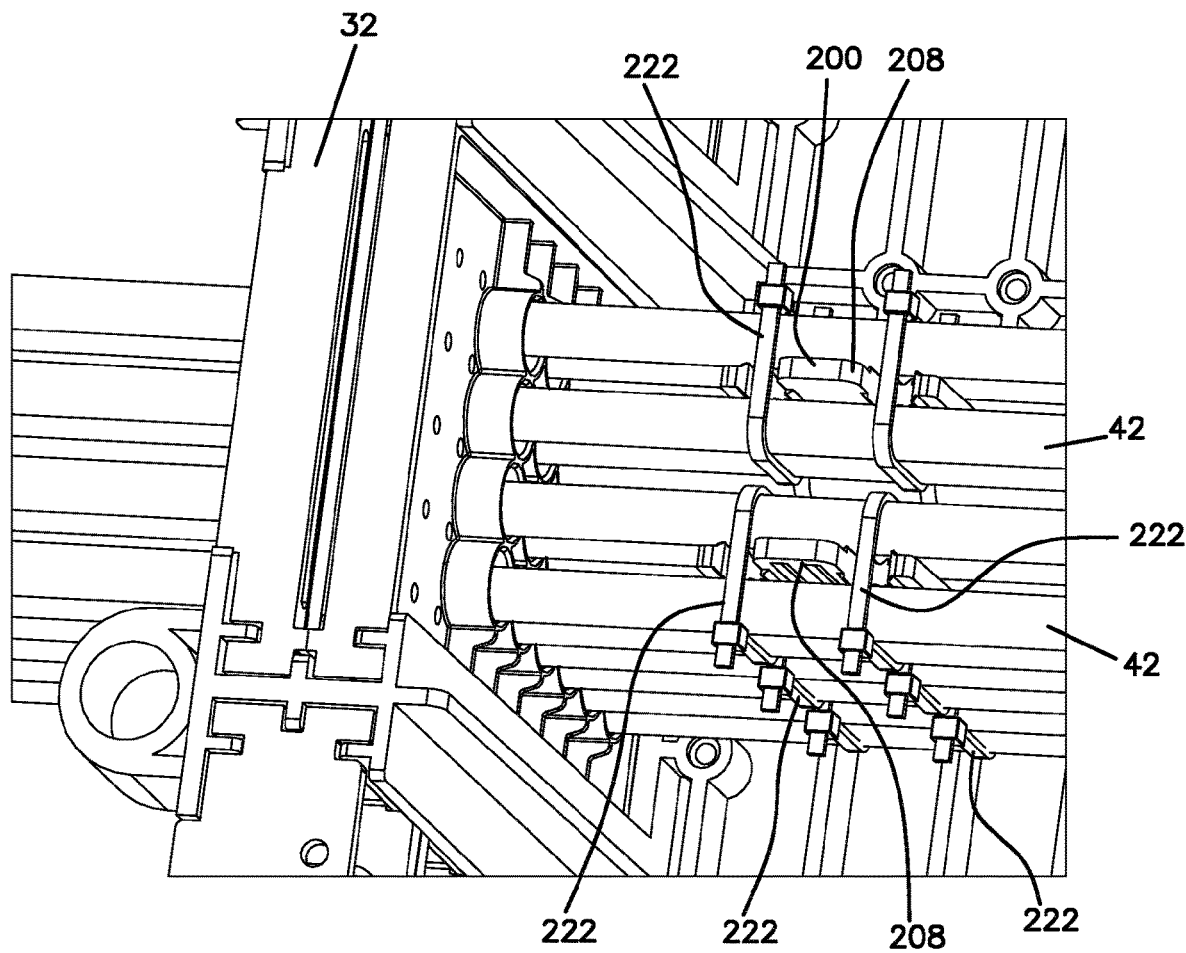
Figure 17:
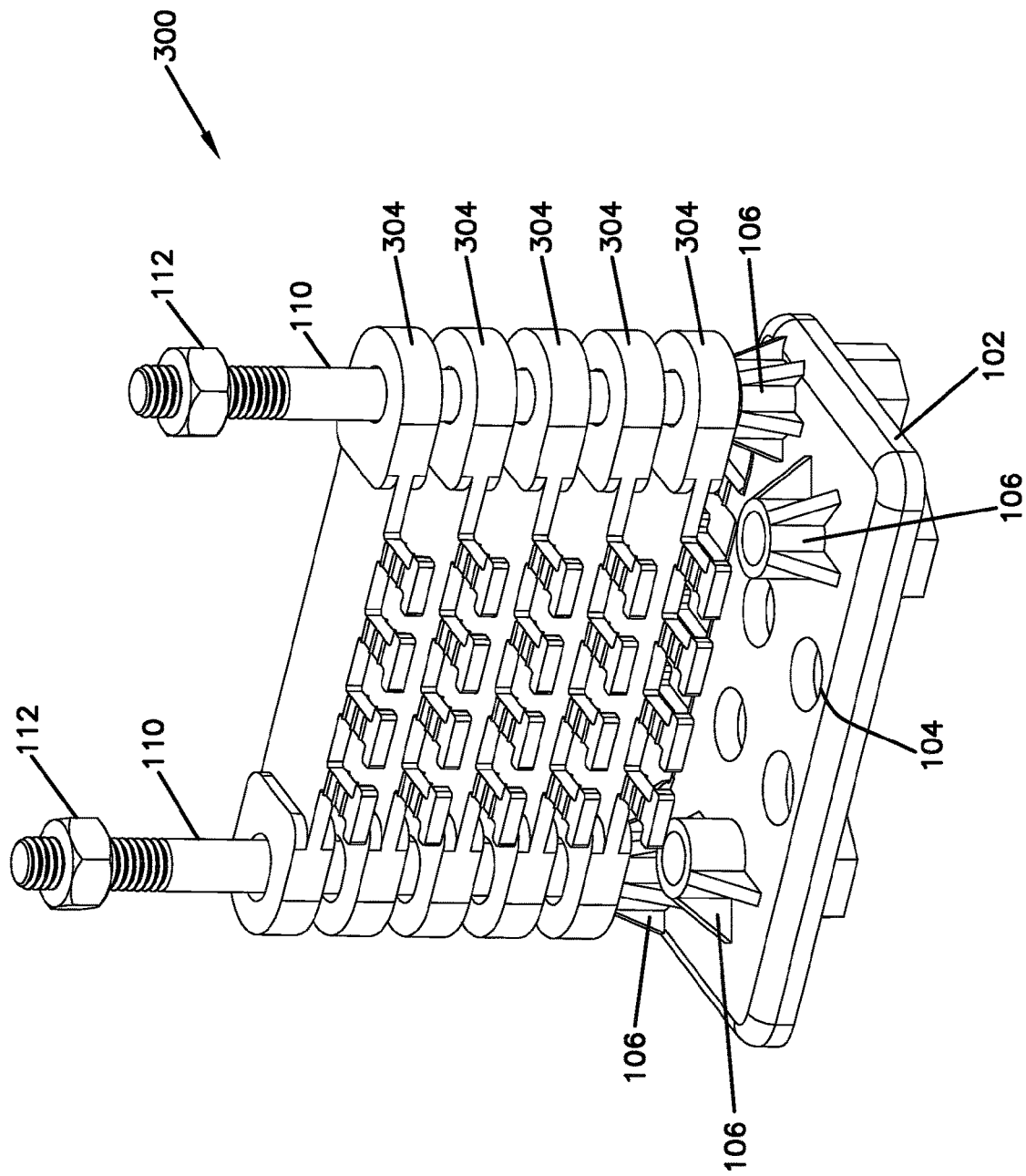
FIG. 17 a perspective view of a third embodiment of a cable fixation device.

Referring now to FIGS. 1-3, enclosure 12 includes a base 14, a cover 16, and an interior 18 for receiving telecommunications cables, connections, splices, splitters, and/or other equipment.

Cables enter enclosure 12 through one or more cable ports 22. Not all of cable ports 22 need be used in every application. In the illustrated example, all four ports 22 are used. Cable ports 22 can be covered by a panel which is removed when cables are used with enclosure 12. The panel can be a breakaway design. Various cable seals 30, 32, 34 are used to seal the individual cables entering at each cable port 22 from the environment, such as from dust or water. Cable seals 30, 32, 34 vary for different sized cables. As shown, different cables 40, 42 are used with different seals 30, 32. Seal 34 is used with a still further different cable.

Each cable fixation device 10 is mounted to base 14 of enclosure 12 with a plurality of fasteners 38.

Referring also to FIGS. 4-12, a first embodiment of a cable fixation device 100 is shown including a base or base element 102. The base element 102 includes mounting holes 104 for mounting base element 102 to base 14 of enclosure 12. Projections 106 each include a hole 108 for receiving a bolt 110. Bolt 110 is used as an upright to hold one or more fixation elements 116. Each fixation element 116 is used to fix a cable to cable fixation device 100. A nut 112 keeps the fixation elements 116 on bolt 110. Base element 102 can receive more than one bolt 110. Pairs of projections 106 can be selected depending on cable types and locations entering through port 22.

Fixation element 116 includes a body 118 having a first end 120 and a second end 124. Disposed at first end 120 is a tie area 126 having a reduced diameter portion 128. Tie area 126 can receive a tie or strap or other fastening loop 152 for connection an exterior of a cable to tie area 126. A zip tie, or a hose clamp are two examples that may be used. Tie area 126 may also include protrusions 130 to increase frictional engagement with the cable. Fixation element 116 may include a second tie area 134 including a hole 136 through body 118 to allow for receipt of a tie or strap. Second tie area 134 may also include protrusions 130.

Adjacent to second end 124 of fixation element 116 is a strength member fixation device 138 for fixing a strength member 48 of the cable to fixation element 116. Strength member fixation device 138 can include a nut 140, a screw 142, and a clamping element 144. Strength member fixation device 138 is not used if cable 42 does not have a strength member, or if the user desires not to secure to the strength member if present.

Fixation element 116 includes an opening 146 for receipt of bolt 110. Opening 146 is located adjacent to a middle area of body 118. Also, it is to be appreciated that opening 146 is oval-shaped.

Fixation element 116 in the example shown has a plurality of directions of freedom of movement. Fixation element 116 can move up and down axially along bolt 110 to better align with the incoming cable 40. Fixation element 116 can also move transversely relative to bolt 110 to accommodate different cables, and/or different locations of the cable entering the enclosure 12. Fixation element 116 can also rotate about bolt 110 to improve alignment with the incoming cable. It is to be appreciated that the preferred fixation element 116 is provided with all three types of freedoms of movement. However, less freedoms of movement can be provided, if desired.

Referring now to FIGS. 13-16, a second embodiment of a cable fixation device 200 is shown having a base 202 and mounting holes 204 for mounting base 202 to base 14 of enclosure 12. Cable fixation device 200 includes one or more uprights 208. Each upright 208 has one or more fixation projections 212. Each fixation projection 212 includes a reduced diameter portion 214. Small projections 218 are provided on each fixation projection 212 to increase frictional engagement with the cables attached to cable fixation device 200. As shown, each fixation projection 212 includes protrusions 218 on opposite sides so as to receive a cable 42 on each side of the fixation projection 212. As shown, each upright 208 includes a plurality of first fixation projections 224 projecting in a first direction and a plurality of second fixation projections 226 aligned with the first fixation projections 224 and projecting in an opposite direction. With the illustrated embodiment, each pair of fixation projections 224, 226 can receive one, two, three or four cables. Two ties 222 are shown used to fix the four cables 42 in a bundle to each upright 208, with the upright 208 positioned in the middle of two opposed pairs of cables. Each fixation protection 212 defines a T-shape in the illustrated example. Fixation device 200 includes a one-piece body 216 including base 202, uprights 208, and fixation projections 212.

Figure 19:
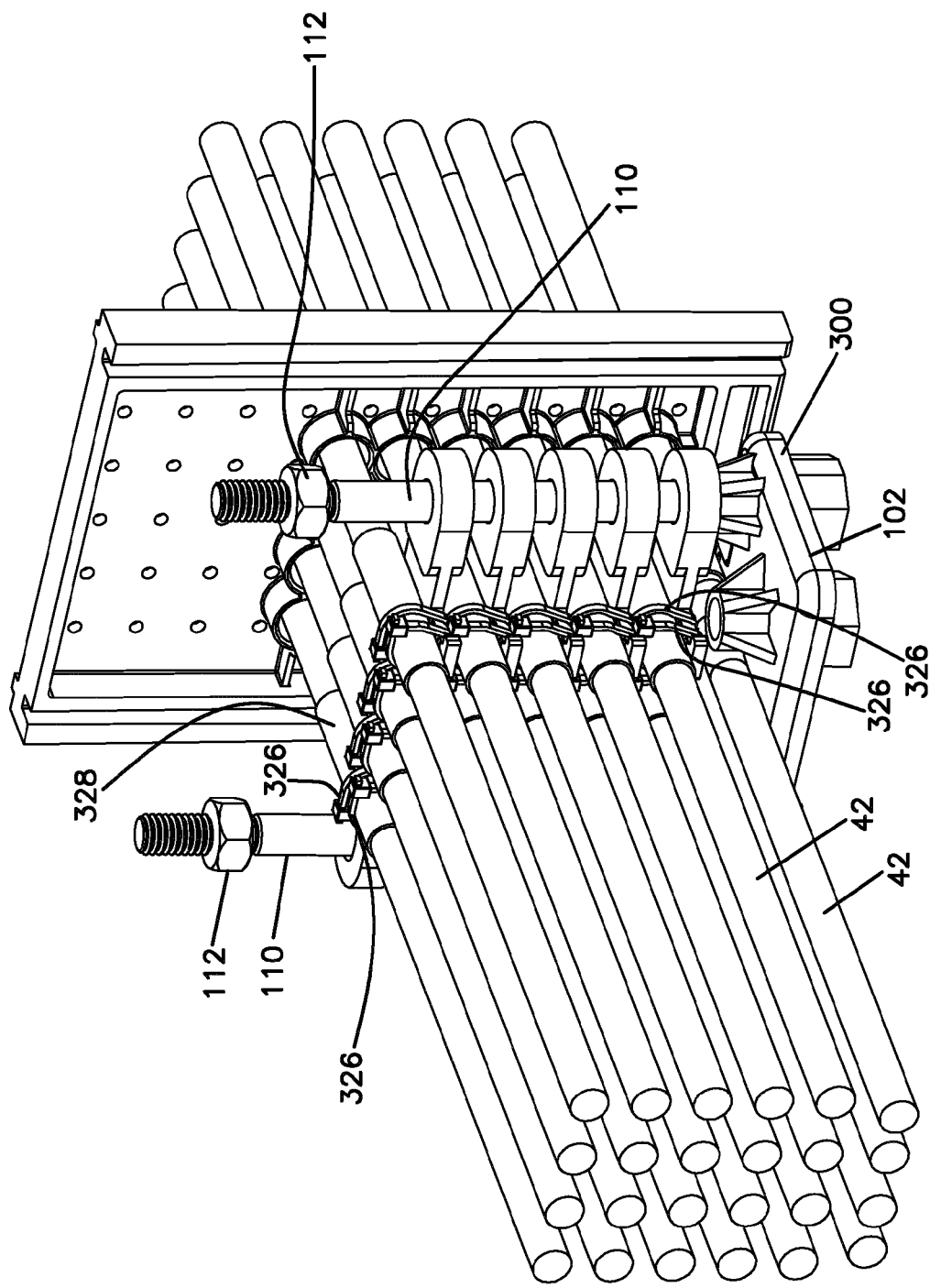
FIG. 19 is a perspective view of the cable fixation device of FIG. 17 fixing cables to the enclosure.

Referring now to FIGS. 5, and 17-19, a third cable fixation device 300 is shown. Cable fixation device 300 includes a base element 102 which mounts in a similar manner to base 14 with fasteners. Fastener holes 108 of projections 106 receive one or more bolts 110. In the preferred example, two bolts 110 are shown, and two nuts 112 are shown. Bolts 110 hold a plurality of plates 304 in a stacked arrangement. Each plate includes a first hole 306 at a first end 310 and a second hole 308 at a second end 312. Second hole 308 is oval shaped. The oval shape accommodates variations in the spacing of bolts 110. Each plate 304 also includes a plurality of fixation projections 316 which can receive a tie 326 for holding a cable to the fixation projection 316. Each fixation projection 316 includes small protrusions 320 to improve frictional engagement with each cable held to cable fixation device 300. As shown, base element 102 also includes fixation projections 318 for each receiving a cable and a cable tie. Small protrusions 320 are also provided on fixation projections 318. Plates 304 can slide axially along bolt 110 as needed to improve cable alignment with cable fixation device 300. Each fixation protection 316, 318 defines a T-shape in the illustrated example with a reduced diameter portion 324. Each fixation protection 316, 318 receives at least one tie 326. As shown in FIG. 19, two ties 326 are used for each cable 42. A wrap 328 may be placed around each cable 42 to increase the fixation force.

Referring back to FIGS. 1-3, a fourth embodiment of a cable fixation device 400 is shown which includes two columns 402 of fixation elements 116 and two bolts 110 mounted to base element 102. Fixation device 400 can hold more cables than device 100.

The various cable fixation devices 100, 200, 300, and 400 can be used as desired depending on the situation for cable fixation and the enclosure 12.

Some of the parts, such as base 102, are useable in several configurations. Multiple numbers of bolts 110 can be used, and the locations of the bolts can be varied.

The floating features of the mounting arrangements of the parts allow the parts to be used with different cables and different cable locations.

In one example embodiment, base element 102, fixation element 116, body 216 including base 202 and uprights 208, and plates 204, are made from molded plastic.

Different cables can be accommodated with the various parts, such as cables with strength members and cables without.

A kit can provided with the various parts to be used with a variety of cable sizes and locations, without requiring custom made brackets specific to a certain cable size or cable location.

The above specification, examples and data provide a complete description of the manufacture and use of the composition of the invention. Since many embodiments of the invention can be made without departing from the spirit and scope of the invention, the invention resides in the claims hereinafter appended.

PARTS LIST 10 cable fixation device
12 enclosure
14 base
16 cover
18 interior
22 cable port
30 cable seal
32 cable seal
34 cable seal
38 fasteners
40 cable
42 cable
48 strength member
100 cable fixation device
102 base element
104 mounting hole
106 projection
108 hole
110 bolt
112 nut
116 fixation element
118 body
120 first end
124 second end
126 tie area
128 reduced diameter portion
130 protrusions
134 second tie area
136 hole
138 strength member fixation device
140 nut
142 screw
144 clamping element
146 opening
148 middle area
152 tie
200 cable fixation device
202 base
204 mounting hole
208 uprights
212 fixation projection
214 reduced diameter portion
216 body
218 protrusions
222 tie
224 first fixation projection
226 second fixation projection
300 cable fixation device
304 plate
306 first hole
308 second hole
310 first end
312 second end
316 fixation projection
318 fixation projection
320 protrusions
324 reduced diameter portion
326 tie
328 wrap
400 cable fixation device
402 column

What is claimed is:

1. A cable fixation device comprising:
a base with holes for receiving rods;
two rods, each rod in one of the holes and extending upwardly from the base, each rod including a threaded end;
a nut on the threaded end of each of the rods;
a plurality of fixation elements positioned on the rods, the fixation elements each including a plurality of T-shaped fixation projections arranged in an array, each of the T-shaped fixation projections including a reduced dimensional portion for receiving a tie, the fixation elements including two holes for receiving the rods, wherein one of the holes in the fixation element has an oval shape;
wherein each fixation element can move along the rods axially; and
wherein each of the plurality of fixation elements includes a base portion extending between the two holes, wherein the plurality of T-shaped fixation projections extend from the base portion in a direction orthogonal to a length of the base portion.

2. The cable fixation device of claim 1, wherein the reduced dimensional portion includes protrusions for engaging a cable jacket.

3. The cable fixation device of claim 1, wherein the reduced dimensional portion or portions are made of plastic.

4. The cable fixation device of claim 3, wherein the base is made from plastic.

5. The cable fixation device of claim 3, wherein the upright is made of plastic.

6. The cable fixation device of claim 1, wherein the base includes fastener holes.

\* \* \* \* \*